May 14, 1935.  C. W. SWARD  2,001,636
TERMINAL FOR ELECTRICAL CONDUCTORS AND THE LIKE
Filed Oct. 18, 1933  2 Sheets-Sheet 1
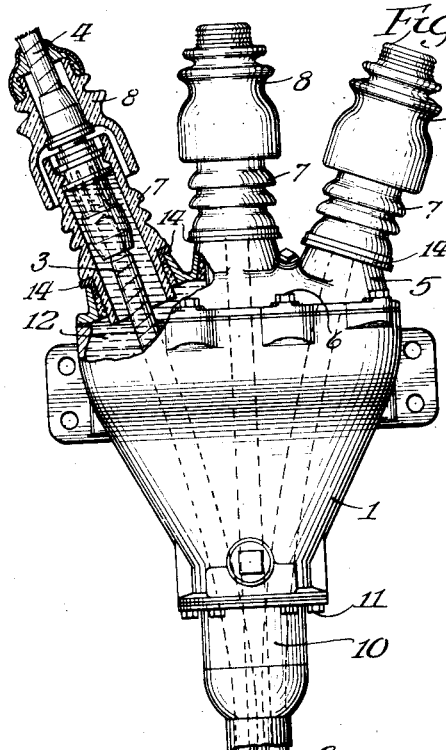
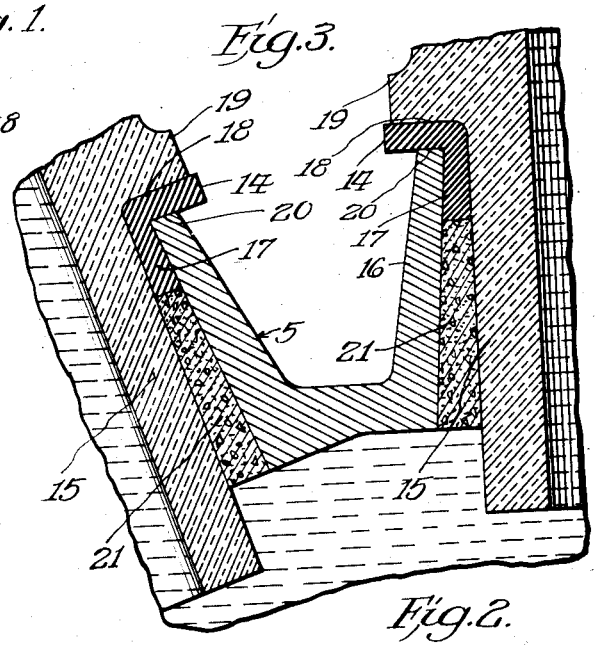
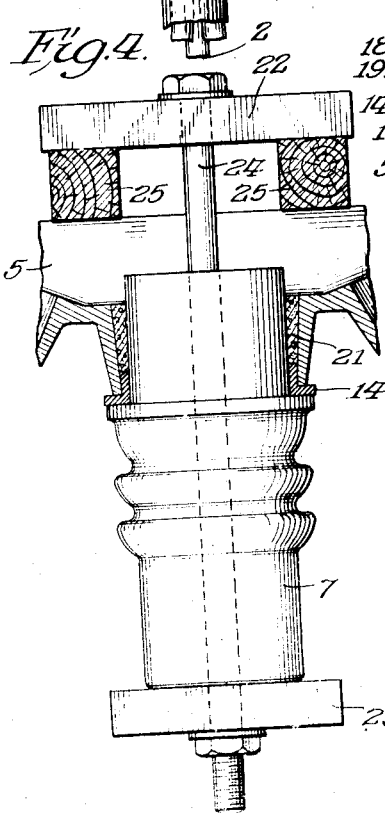
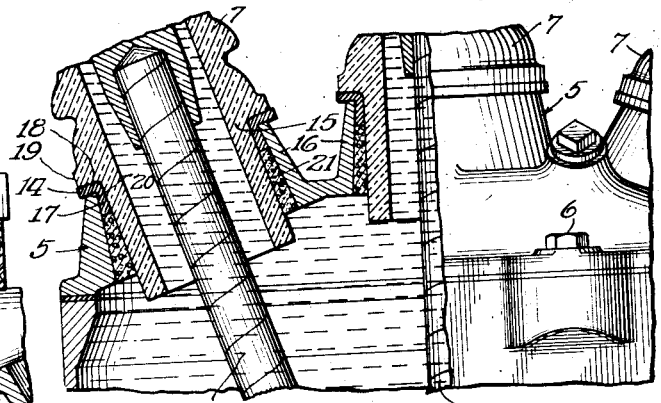
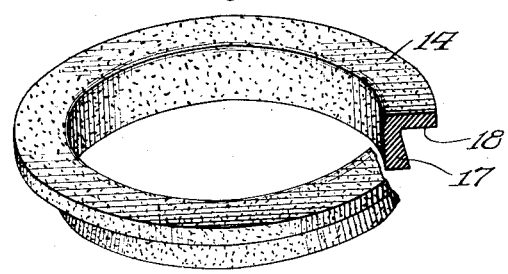
Inventor
Cecil W. Sward.
By A. Miller Belfield
Atty.

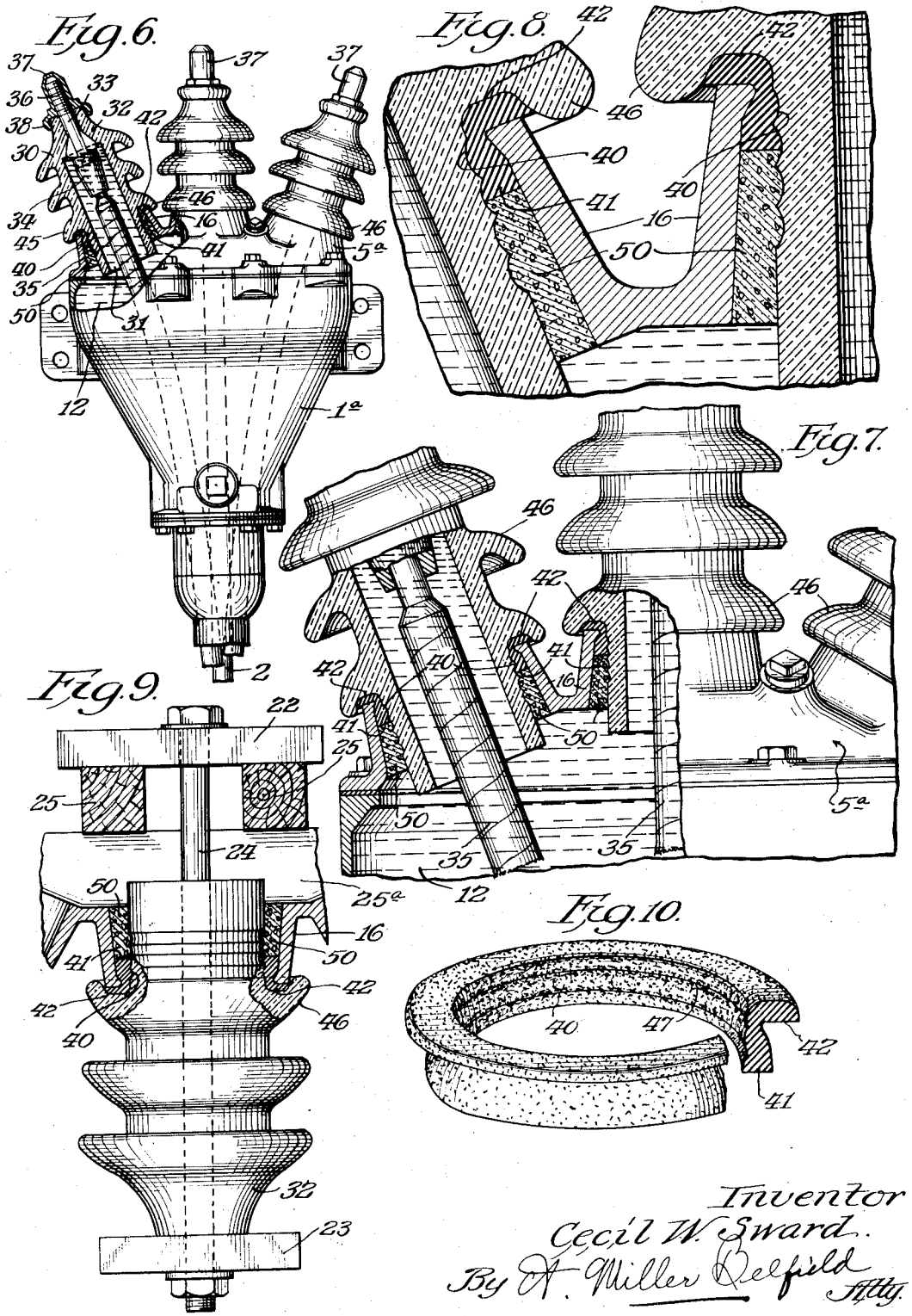

Patented May 14, 1935

2,001,636

UNITED STATES PATENT OFFICE 2,001,636

TERMINAL FOR ELECTRICAL CONDUCTORS AND THE LIKE

Cecil W. Sward, Chicago, Ill., assignor to G & W Electric Specialty Co., Chicago, Ill., a corporation of Illinois Application October 18, 1933, Serial No. 694,087

5 Claims. (Cl. 247—6)

My invention relates to terminals for electrical conductors and the like, such devices for example as electrical potheads for terminating and connecting underground cables and overhead insulated wires, insulator bushings or terminals and the like.

One of the objects of the invention is to provide a simple, practical and effective device of the class specified, and particularly a simple, practical and effective pothead device.

Another object of the invention is to secure a tight joint or seal for preventing the leakage of oil usually contained in devices of this kind.

Other objects of the invention will appear and be pointed out hereinafter.

In the accompanying drawings—

Fig. 1 is a side elevation of a multiple conductor pothead embodying my present invention, a part of the device being broken away for convenience of illustration;

Fig. 2 is a view partly in elevation, partly in vertical section, of a portion of said device on an enlarged scale;

Fig. 3 is a cross section of a detail of construction on an even larger scale;

Fig. 4 is a side elevation of part of the device in an upside down condition;

Fig. 5 is a perspective view of a detail of construction;

Fig. 6 is a view similar to Fig. 1 of a modified form of multiple conductor pothead embodying the present invention;

Fig. 7 is a side elevation on an enlarged scale of a portion of the device shown in Fig. 6, part of this Fig. 7 being broken away for convenience of illustration;

Fig. 8 is a cross sectional view of a detail of construction;

Fig. 9 is a view partly in elevation and partly in vertical section of a portion of the device in an upside down condition; and Fig. 10 is a perspective view of a detail of construction.

Referring to the drawings, and particularly to the device shown in Figs. 1 to 5 inclusive, I show a pothead device embodying a bowl I preferably of an upwardly flaring type in order to permit the spread within it of the conductors of a multiple conductor cable, which said cable 2 is brought into the lower part of the device and spread so that its three conductors 3 may be separated for independent connection with three overhead insulated conductors 4.

A cover 5 is mounted on the bowl I and preferably secured thereto by bolts 6. Tubular insulators 7 are mounted on the cover 5 and form outlets for the conductor strands 3. Removable caps 8 are mounted on the insulators 7 and receive the overhead conductors 4 which are connected with the cable conductors 3 by suitable connecting devices.

At the lower end of bowl I is a tubular member 10 for the cable 2, said member 10 being detachably secured to bowl I by bolts 11—11.

The bowl I and the cover 5 are preferably of metal such as iron and the bolts 6 by which the cover 5 is secured to the bowl I are metal. In the use of devices of this kind it is found that the expansion and contraction of the metal members, particularly the cover 5, cracks the porcelain of the insulators 7 and this permits leakage of the oil 12 which is usually employed in devices of this kind. My present invention eliminates this trouble and prevents leakage of the oil.

To this end I provide special oil seals between the insulators 7 and cover 5. The one shown herein preferably consists of a collar member 14 arranged around the lower end of the insulators 7 and fitting between the shouldered end 15 of said insulator and the upstanding flange or collar 16 on cover 5, which receives the lower end of insulator 7. The sealing member or seal 14 preferably is in angular form, having a body portion 17 which fits around the lower end of the insulator and an outwardly extending flange 18 which fits between the shoulder 19 on insulator 7 and the shoulder formed by the upper end of the collar 16 on cover 5. This collar or seal is preferably made of some special material such as resistoyl, a material particularly adapted for the purposes of this invention.

The space in the cover flange 16 below the seal 14 is preferably filled with cement 21 and this is preferably hardened under pressure so that it with the seal 14 forms a tight joint making an effective oil seal adapted to prevent the leakage of oil and also to permit the expansion and contraction of the members of the device without bad results.

In Fig. 4 I show this sealing arrangement consisting of a sealing member 14 and cement 21 and the way in which it is embodied in the device. In this Fig. 4 an insulator 7 is shown in an upside down position with the seal 14 and cement 21 properly located and a clamp arrangement for compressing the seal 14 before cement 21 is introduced. This clamp arrangement conveniently consists of clamping members 22—23 and a bolt 24 between them and blocks 25—

25 resting on the cover 5 so that pressure may be exerted on the cover and thence on member 14.

By this arrangement the oil 12 is effectively sealed against leakage between the cover and insulator 7 and at the same time these various members may expand and contract as required by changing atmospheric and temperature conditions without doing any damage to the device.

Referring now to the modification shown in Figs. 6 to 10, inclusive, I show a pothead having a bowl 1a into which the cable 2 is led, the device being of the same general character as the pothead structure shown in Fig. 1, except that whereas the device of Fig. 1 is a disconnecting pothead with connecting and disconnecting contact devices in the insulator 7 and cap 8 to permit connecting and disconnecting the cable conductors with the overhead lines, the device of Fig. 6 on the other hand is not a disconnecting pothead but is for permanently connecting the ends of the cable conductors to the overhead lines.

To such end this device of Fig. 6 has its cover 5a provided with upstanding flanges or rings 16 which receive the tubular insulators 30 whose lower end opens into the interior of the bowl 1a at 31 and whose upper end is substantially closed at 32, receiving a metallic terminal 33 which is provided with a socket 34 to receive the upper end of cable conductor 35. The upper end of terminal 33 is preferably screw-threaded as at 36 and provided with a cap 37 to which connection may be made, said cap preferably having an end portion 38 which extends down below the upper end of insulator 32 so as to cover and seal the joint between cap 37 and insulator 32.

The interior bowl 1a is preferably filled with oil 12 which extends up into the interior of tubular insulator 30.

As a seal to prevent the escape of this oil 12 I show a gasket member 40 fitted between the lower portion of insulator 30 and upper portion of cover flange 16, this gasket member being preferably in the form of a ring as shown in Fig. 10, having a tubular portion 41 to fit between members 30 and 16 and an outwardly extending flange portion 42 to extend outwardly over the top of member 16. Preferably said flange portion 42 lies immediately below a petticoat 45 which is one of several petticoats with which insulator 30 is preferably provided. This petticoat 45 preferably has a downwardly extending rim portion 46 which extends down beyond the outer edge of flange 42 of member 40, so as to cover said flange 42 and thereby protect the same against the elements such as snow and rain.

This gasket member 40 is preferably of some moderately soft material, capable of standing a certain amount of compression but at the same time having a long life and being very resistant to oil and capable of effectively excluding moisture. I find resistoyl to be one very satisfactory kind of material for this gasket.

As a preferred arrangement the inner surface of the member 40 is fluted as at 47 and the adjacent surface of the insulator 30 is likewise fluted so as to form a good connection between said gasket member and the tubular insulator 30.

Preferably as part of the oil seal I employ a cement material for cooperating with the gasket member 40, such cement material being shown at 50 and being located in space within the lower portion of cover rim 16 and insulator 30 below gasket member 40 and preferably in contact with the lower edge of said gasket member. This gasket member 40 is preferably under compression so as to make a firm and effective oil seal. Application of cement material 50 retains this compression. This compression may be secured by a clamp arrangement shown in Fig. 9, being similar to the clamping arrangement shown in Fig. 4. In this arrangement clamping members 22 and 23 are shown operated by a bolt 24, and clamping blocks 25 are placed between member 22 and the member 25a so that pressure may be obtained by turning bolt 24 to compress gasket 40 and thereby put the same under compression.

It will be seen that this type of device is quite similar to that shown in Figs. 1 to 5, inclusive, involving the gasket member preferably under pressure with cement material, the two devices differing somewhat in specific construction.

It will be understod that changes and modifications may be made without departing from the spirit of the invention.

What I claim is:

1. A device of the class specified having an oil seal comprising a gasket member fitting between a tubular insulator and a tubular metallic member containing an end portion of said insulator, said gasket member having a tubular portion surrounding the insulator and a flange portion extending outwardly between shoulders on the insulator and metallic surrounding member, and cement material located in the space between the tubular insulator and surrounding tubular member below the tubular portion of the gasket.

2. A device of the class specified having an oil seal comprising a gasket member fitting between a tubular insulator and a tubular metallic member containing an end portion of said insulator, said gasket member having a tubular portion surrounding the insulator and a flange portion extending outwardly between shoulders on the insulator and metallic surrounding member, and cement material located in the space between the tubular insulator and surrounding tubular member below the tubular portion of the gasket, said gasket member being under compression.

3. A device of the class specified having an oil seal comprising a gasket member fitting between a tubular insulator and a tubular metallic member containing an end portion of said insulator, said gasket member having a tubular portion surrounding the insulator and a flange portion extending outwardly between shoulders on the insulator and metallic surrounding member, said gasket member having a fluted portion cooperating with a fluted exterior on the tubular insulator, and cement material between the tubular insulator and surrounding metallic member and below the gasket member and in contact therewith, the tubular insulator having a petticoat extending down and covering the outer edge of said gasket member.

4. A device of the class specified having an oil seal comprising a gasket member fitting between a tubular insulator and a tubular member containing an end portion of the insulator, said gasket member having a tubular portion surrounding the insulator and a flange portion extending outwardly between the shoulders on the insulator and metallic surrounding member, the space between the insulator and tubular member containing the end thereof tapering inwardly in an outward direction and the portion of the gasket member within said space being likewise tapered, and cement material also between the tubular insulator and tubular member containing the same.

5. A device of the class specified comprising a casing member having an opening provided with an outwardly extending tubular rim and an insulator arranged within said opening within said rim, and a gasket member having a tubular portion arranged between the insulator and rim, a flange portion extending outwardly between the upper edge of said rim and a co-operating shoulder on the insulator, the flange portion of said gasket being under compression, and cement material between the insulator and said cement, said cement material retaining the gasket under compression.

CECIL W. SWARD.